US007416393B2

(12) United States Patent
Richter

(10) Patent No.: US 7,416,393 B2
(45) Date of Patent: Aug. 26, 2008

(54) APPARATUS AND METHOD FOR JOINING A ROTOR BLADE TO A ROTOR MOUNT OF A GAS TURBINE ROTOR

(75) Inventor: Karl-Hermann Richter, Markt Indersdorf (DE)

(73) Assignee: MTU Aero Engines GmbH, Munich (DE)

( * ) Notice: Subject to any disclaimer, the term of this patent is extended or adjusted under 35 U.S.C. 154(b) by 35 days.

(21) Appl. No.: 10/567,518

(22) PCT Filed: Jul. 23, 2004

(86) PCT No.: PCT/DE2004/001654

§ 371 (c)(1),
(2), (4) Date: Aug. 2, 2006

(87) PCT Pub. No.: WO2005/014221

PCT Pub. Date: Feb. 17, 2005

(65) Prior Publication Data

US 2007/0181539 A1  Aug. 9, 2007

(30) Foreign Application Priority Data

Aug. 8, 2003 (DE) ................. 103 36 587

(51) Int. Cl.
*F01D 5/32* (2006.01)
(52) U.S. Cl. .................. 416/213 R; 416/219 R; 416/220 R; 219/98; 219/99; 29/402.07; 29/402.16; 29/526.4; 29/889.1; 29/889.21

(58) Field of Classification Search ............. 416/213 R, 416/213 A, 219 R, 220 R, 248; 219/98–99; 29/402.16, 402.07, 526.4, 889.1, 889.21, 29/889.22
See application file for complete search history.

(56) References Cited

U.S. PATENT DOCUMENTS

| 2,831,958 | A |   | 4/1958  | Richardson              |
|-----------|---|---|---------|-------------------------|
| 3,112,914 | A | * | 12/1963 | Wellman ......... 416/219 R |
| 3,392,257 | A | * | 7/1968  | Glorioso ............ 219/98 |
| 3,609,841 | A | * | 10/1971 | Telfer et al. ....... 29/889.21 |
| 3,770,933 | A |   | 11/1973 | Holko et al.            |
| 4,096,615 | A |   | 6/1978  | Cross                   |
| 4,260,331 | A | * | 4/1981  | Goodwin ......... 416/219 R |
| 4,824,328 | A |   | 4/1989  | Pisz et al.             |
| 5,349,152 | A | * | 9/1994  | Renner ............... 219/99 |
| 5,366,344 | A | * | 11/1994 | Gillbanks et al. ... 416/213 R |
| 5,511,949 | A | * | 4/1996  | Thore .............. 416/213 R |
| 5,880,425 | A |   | 3/1999  | Carnes, Jr. et al.      |
| 6,193,141 | B1 |  | 2/2001  | Burke et al.            |
| 6,478,545 | B2| * | 11/2002 | Crall et al. ......... 416/213 R |
| 6,666,653 | B1| * | 12/2003 | Carrier ............. 416/213 R |

FOREIGN PATENT DOCUMENTS

DE  100 31 137 A1  2/2001
FR  2.226.241       11/1974

* cited by examiner

*Primary Examiner*—Christopher Verdier
(74) *Attorney, Agent, or Firm*—Crowell & Moring LLP

(57) ABSTRACT

A gas turbine rotor and a method for manufacturing a gas turbine rotor having integral blading, is disclosed. A rotor blade has a blade pan and a blade footing connected to the blade pan. The blade footing is designed with a V-shaped cross section in at least some portions and the blade footing is welded to a rotor mount by capacitor discharge welding.

7 Claims, 5 Drawing Sheets

APPARATUS AND METHOD FOR JOINING A ROTOR BLADE TO A ROTOR MOUNT OF A GAS TURBINE ROTOR

BACKGROUND AND SUMMARY OF THE INVENTION

This application claims the priority of International Application No. PCT/DE2004/001654, filed Jul. 23, 2004, and German Patent Document No. 103 36 587.7, filed Aug. 8, 2003, the disclosures of which are expressly incorporated by reference herein.

The present invention relates to a rotor blade for gas turbine rotors. In addition the invention relates to a method for manufacturing gas turbine rotors having integral blading.

Gas turbine rotors having integral blading are identified as blisks or blings according to whether they have a disk-shaped rotor and/or rotor mount or a ring-shaped rotor and/or rotor mount. Disk-shaped gas turbine rotors having integral blading are referred to by the term blisk (bladed disk) and ring-shaped gas turbine rotors having integral blading are referred to by the term bling (bladed ring).

It is known from the related art that gas turbine rotors having integral blading can be manufactured by the so-called method of milling from a solid block. Milling from a solid block is used mainly to manufacture relatively small gas turbine rotors. For example, milling from a solid block is suitable in particular for mass production of blisks or blings having relatively small titanium blade pans. Milling blisks or blings from a nickel alloy is problematical because of the poor workability of this material.

Another method of manufacturing gas turbine rotors having integral blading, which is known from the related art, involves joining finished rotor blades to the rotor mount, i.e., the hub, by so-called linear friction welding. In linear friction welding, one of the parts to be joined is clamped in a fixed position while the other part is oscillated linearly and pressed with pressure against the fixedly clamped part. The friction heats up the area of the weld zone to a forging temperature and the pressure results in the development of a welding bulge in the joining area. In the manufacture of relatively large gas turbine rotors, i.e., gas turbine rotors having relatively large blade pans, linear friction welding is more economical and less expensive than milling from a solid block.

Against this background, the problem on which the present invention is based is to propose a novel rotor blade for gas turbine rotors and a novel method for manufacturing gas turbine rotors having integral blading.

According to this invention, the blade footing of the rotor blades is adjusted so that the blade footing is designed with a V-shaped cross section in at least some portions in order to manufacture a gas turbine rotor having integral blading by means of capacitor discharge welding, in particular capacitor discharge stud welding.

According to an advantageous refinement of the present invention, the footing of the blade has a cross section adapted to the introduction of pressure forces in an area situated between the blade pan and the area designed with the V-shaped cross section. The blade pan preferably has a protrusion running in the longitudinal direction of the blade pan or at least a groove running in the longitudinal direction in order to introduce the pressure forces.

Preferred refinements of the present invention are derived from the following description.

BRIEF DESCRIPTION OF THE DRAWINGS

Exemplary embodiments of the present invention are explained in greater detail on the basis of the drawings without being limited to this description. The drawings show.

DETAILED DESCRIPTION OF THE DRAWINGS

The present invention is described in greater detail below with reference to FIGS. 1 through 7. FIGS. 1 through 6 show rotor blades according to this invention for gas turbine rotors for manufacturing gas turbine rotors having integral blading. FIG. 7 shows a detail of a gas turbine rotor having a rotor blade attached to a gas turbine rotor, whereby the arrangement according to FIG. 7 does not show the final gas turbine rotor but instead shows only an intermediate thereof in its manufacture.

In the sense of the present invention, it is proposed that gas turbine rotors having integral blading shall be manufactured by manufacturing the rotor blades separately and then joining the rotor blades thus manufactured onto a rotor mount. The joining of the rotor blades to the rotor mount to produce a gas turbine rotor having integral blading is performed in the sense of the present invention by capacitor discharge welding, in particular by capacitor discharge stud welding.

Before discussing the details of the individual process steps for producing gas turbine rotors having integral blading, the details of the inventive rotor blade will be described below, these rotor blades being adapted according to this invention to capacitor discharge welding, namely capacitor discharge stud welding.

Figure 1:
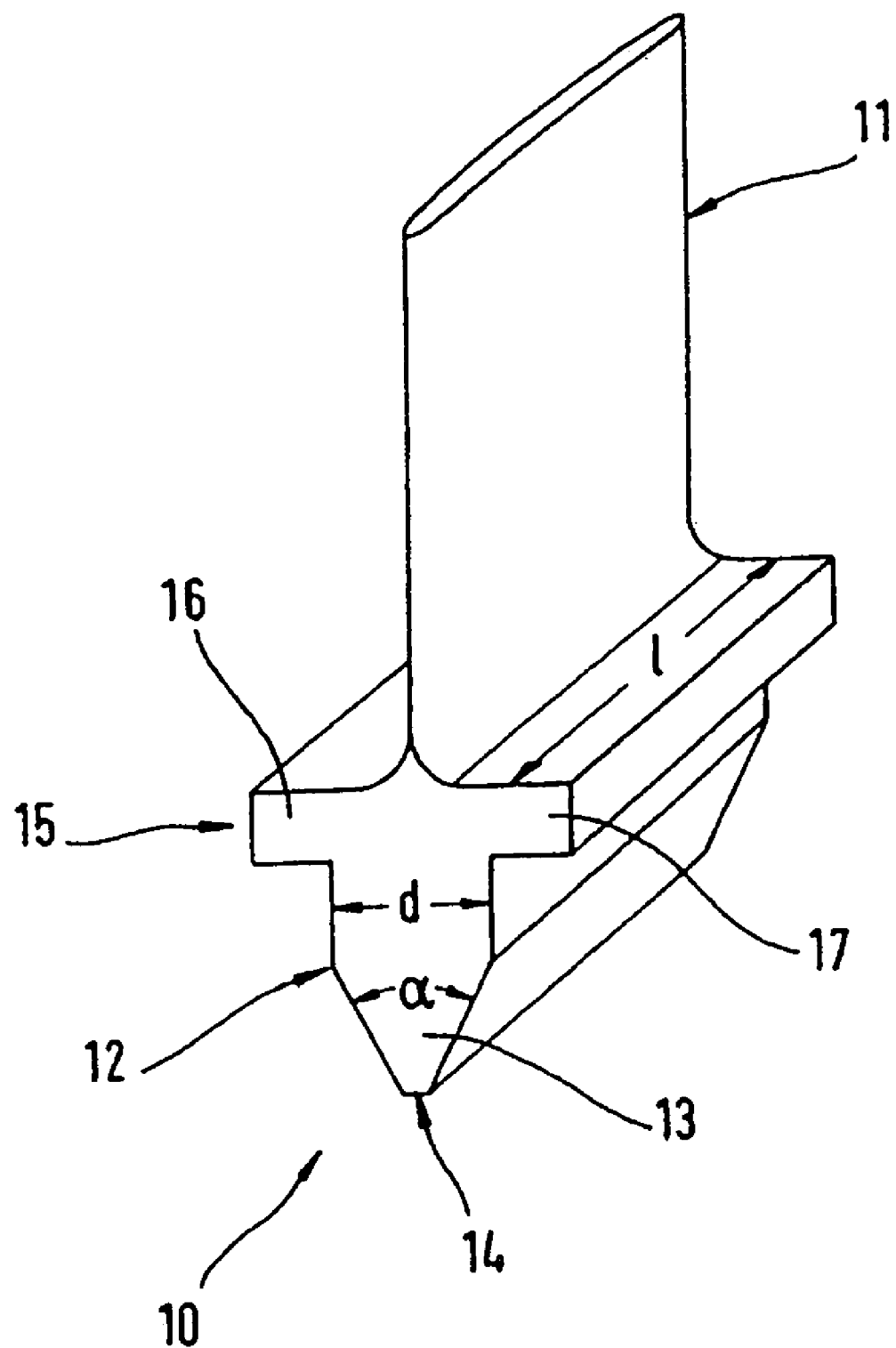
FIG. 1 illustrates an inventive rotor blade for gas turbine rotors according to a first exemplary embodiment of the present invention in a schematized perspective side view.

FIG. 1 shows a perspective side view of an inventive rotor blade 10 which is adapted to the production of gas turbine rotors having integral blading by means of capacitor discharge stud welding. The rotor blade 10 according to FIG. 1 has a blade pan 11 and a blade footing 12 which is connected to the blade pan 11. The blade footing 12 is adjusted according to this invention for manufacturing a gas turbine rotor having integral blading with the help of the capacitor discharge stud welding method such that the blade footing 12 is designed with a V-shaped cross section in at least some portions. It can thus be seen from FIG. 1 that the blade footing 12 is designed with a V-shaped cross section in a lower area 13 facing away from the blade pan 11.

This V-shaped area 13 serves the purpose of contacting the rotor blade 10 to a disk-shaped or ring-shaped rotor and/or rotor mount (not shown) in capacitor discharge stud welding. In bringing the rotor blade 10 in contact with the rotor and/or rotor mount, the rotor blade 10 thus comes in contact with the rotor in an acutely tapered end 14 of the V-shaped area 13. Starting from the acutely tapered end 14 of the area 13, the latter expands toward the blade pan 11 until it has the width d of the blade footing 12 and develops into the latter. As FIG. 1 shows, the V-shaped area 13 extends over the entire length l of the rotor blade 10 and/or the blade pan 11. As FIG. 1 also shows, the V-shaped area 13 is determined in cross section by an opening angle α. The opening angle a preferably amounts to approximately 70°.

Figure 2:
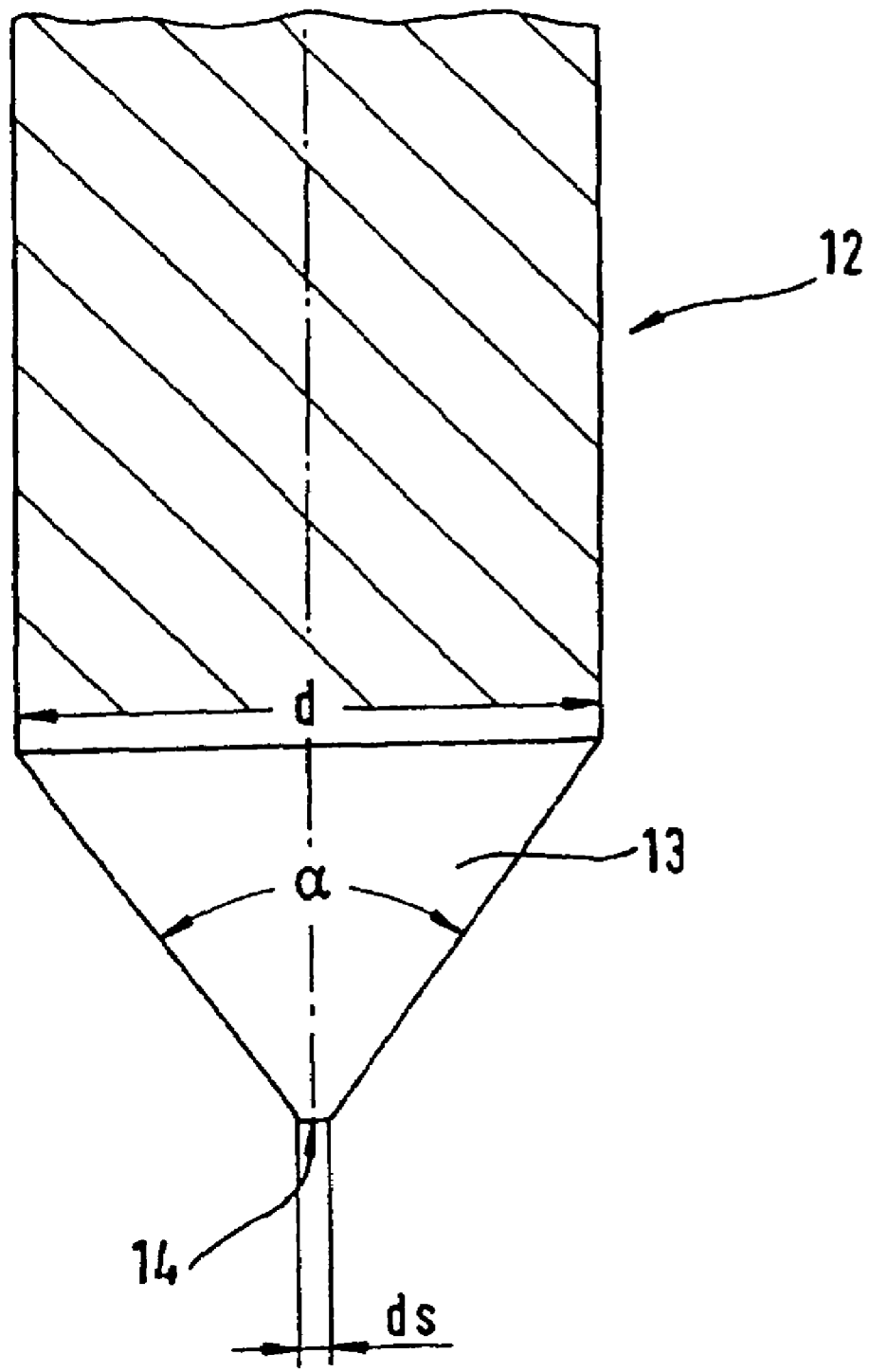
FIG. 2 illustrates a detail of the rotor blade according to FIG. 1 in cross section.

As shown by FIG. 2 in particular, which shows a cross section through the blade footing 12 and the V-shaped area 13, the acutely tapered end 14 of the V-shaped area 13 forms a truncated end with a defined width ds, which is preferably in the range of less than 1 cm, especially 0.1 cm.

FIG. 1 shows that the inventive rotor blade 10 has a cross section adapted to the introduction of pressure forces in capacitor discharge stud welding; this cross section is in an area 15 which is situated between the area 13, which is designed with a V-shaped cross section, and the blade pan 11. According to FIG. 1, the inventive rotor blade 10 to this end has a projection 16 and/or 17 on each side. The projections 16 and 17 extend in the longitudinal direction of the blade footing 13 over the entire length l of same. The projections 16 and 17 form shoulders by which the pressure force required in capacitor discharge welding can be applied reliably and in a defined manner with the help of a tool acting in a form-fitting manner on the projections 16 and 17.

Figure 6:
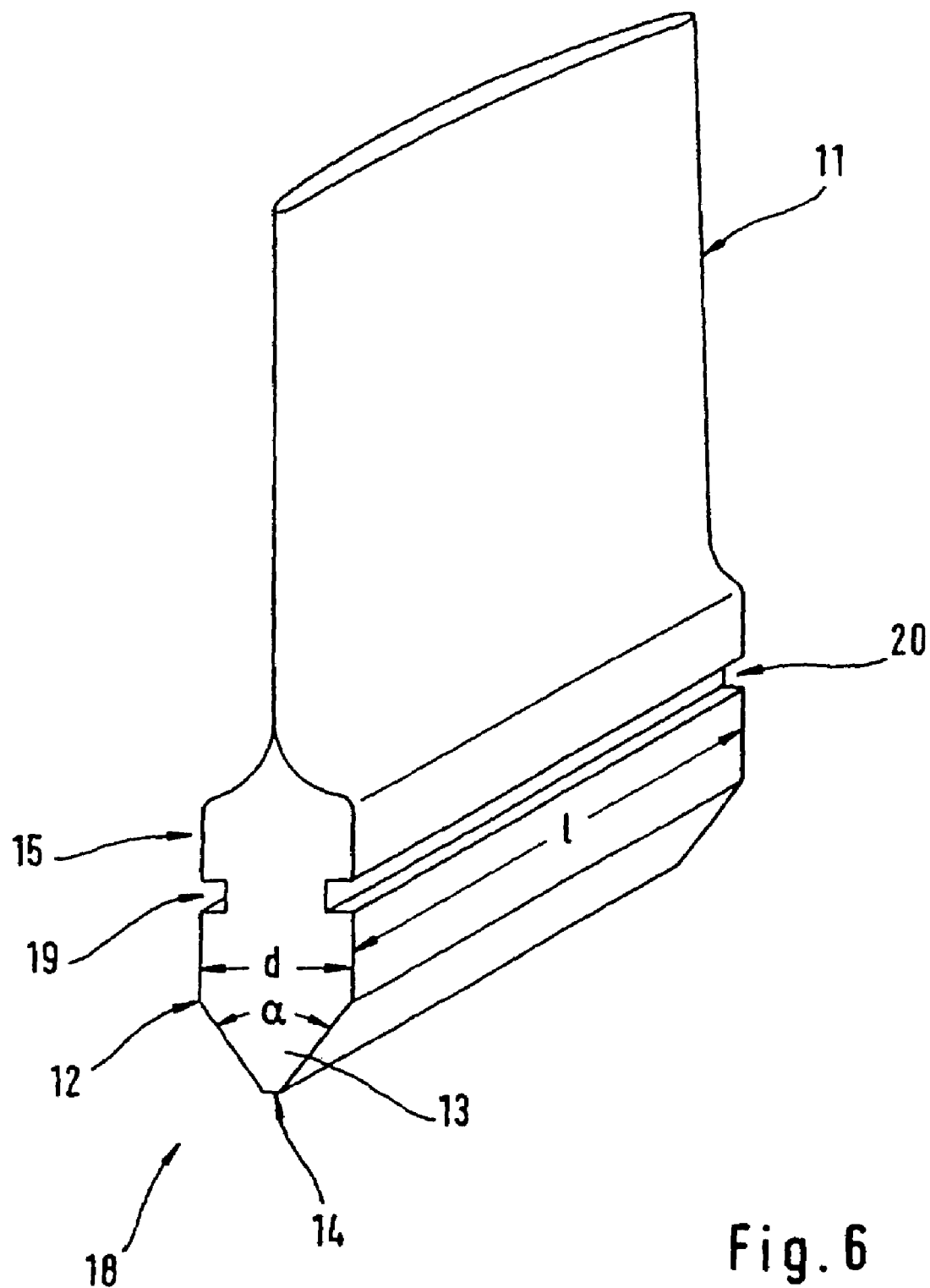
FIG. 6 illustrates an inventive rotor blade for gas turbine rotors according to a fourth exemplary embodiment of the invention in a schematic perspective side view.
Figure 7:
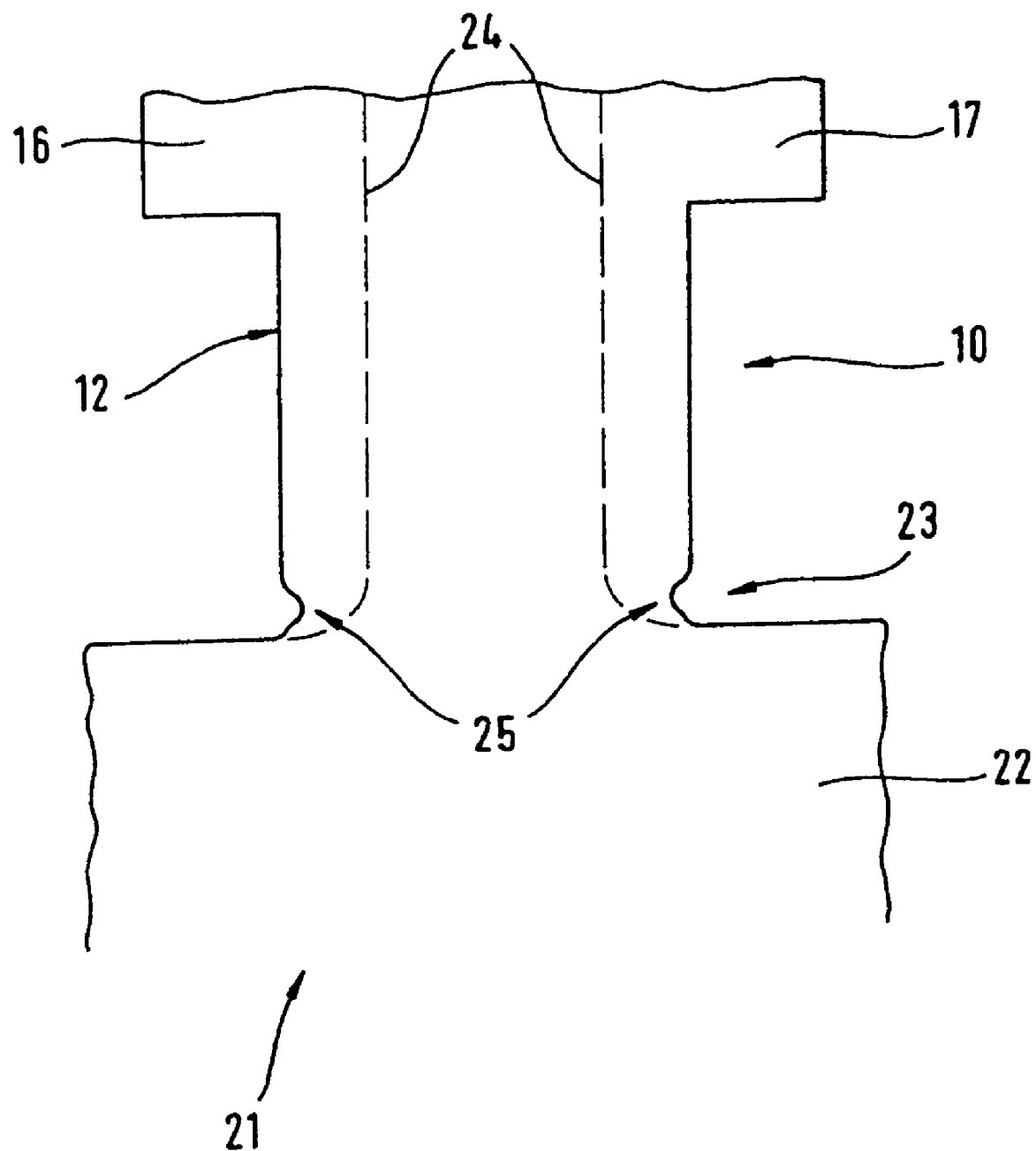
FIG. 7 illustrates a detail of a gas turbine rotor having a rotor blade according to this invention attached to the gas turbine rotor as shown in a schematic cross section.

FIG. 6 shows a rotor blade 18 according to an alternative exemplary embodiment of the present invention. The rotor blade 18 according to FIG. 6 corresponds essentially to the rotor blade 10 according to FIG. 1. The same reference numerals are therefore used for the same modules. The rotor blade 18 according to FIG. 6 differs from the rotor blade 10 according to FIG. 1 only in that there are no projections for introducing the pressure force but instead there are only grooves 19 and 20. The grooves 19 and 20 in turn extend toward both sides of the blade footing 12 and/or the rotor blade 10 over the entire length l thereof, with such a groove 19 and/or 20 running on each side of the blade pan 11 and/or the blade footing 12. A tool can engage in a form-fitting manner in the grooves 19 and 20 to supply the pressing force required in capacity discharge stud welding and to do so reliably and in a defined manner.

At this point, it should be mentioned that an embodiment of the inventive rotor blade in which neither the projections 16 and 17 nor the grooves 19 and 20 are present is of course also conceivable. It is thus possible for the rotor blades to have a cross-sectional area which serves to provide a force-locking and/or friction-locking introduction of the pressure force required in capacitor discharge stud welding. An embodiment of the rotor blade having the projections 16 and 17 and/or grooves 19 and/or 20 for introduction of the pressure force is preferred.

Figure 3:
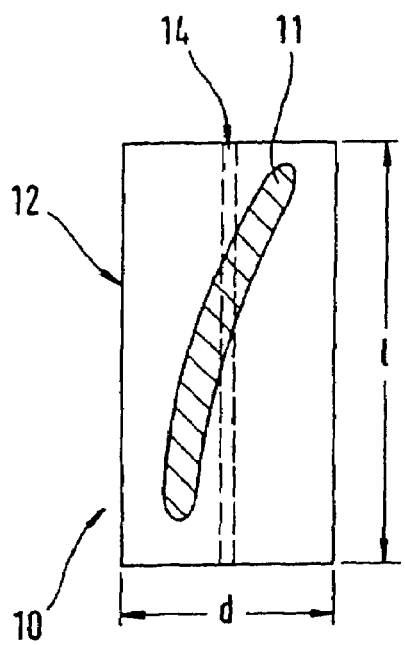
FIG. 3 illustrates the rotor blade according to FIG. 1 in a view from above.
Figure 4:
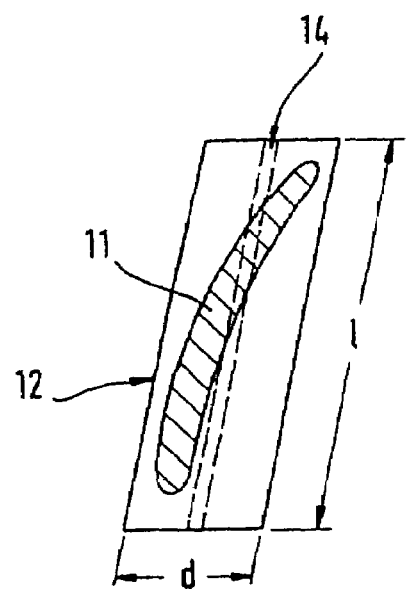
FIG. 4 illustrates an inventive rotor blade for gas turbine rotors according to a second exemplary embodiment of the invention in a view like that in FIG. 3.
Figure 5:
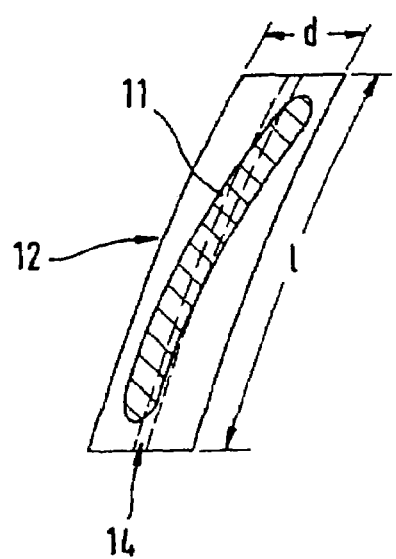
FIG. 5 illustrates an inventive rotor blade for gas turbine rotors according to a third exemplary embodiment of the invention in a view like that in FIGS. 3 and 4.

FIG. 3 shows in a highly schematic diagram a top view of the rotor blade according to FIG. 1, whereby to illustrate the geometric dimensions of the blade footing 12, the projections 16 and 17 have not been depicted in FIG. 3. FIG. 3 shows that the rotor blades 10 according to FIG. 1 have a rectangular base area with the length l and the width d in the area of the blade pan 12. The acutely tapering end 14 of the area 13 having a V-shaped cross section runs centrally and parallel to the borders of the blade footing 12. FIGS. 4 and 5 show alternative embodiments of inventive rotor blades in the area of the blade footing 12. For example the blade footing according to FIG. 4 has a trapezoidal base area and the blade footing 12 according to FIG. 5 has a trapezoidal base area with a curved lateral border. The acutely tapering end 14 of the area 13 having a V-shaped cross section in turn runs centrally and parallel to the lateral borders of the particular blade footing 12. The embodiment according to FIGS. 4 and 5 has the advantage over the embodiment according to FIG. 3 that in the case of base areas of the blade footing 12 designed as a trapezoid, the contour of the blade footing 12 is adapted to the contour of the blade pan 11 and thus the base area of the blade footing 12 may be designed to be smaller. In this way, the welding energy required in capacitor discharge welding can be lower than that required with a rectangular base area according to FIG. 3.

As already mentioned several times, the inventive rotor blades are adapted for manufacturing gas turbine rotors having integral blading by capacitor discharge stud welding. In the manufacture of gas turbine rotors having integral blading with the help of the capacitor discharge stud welding and the inventive rotor blades, the procedure used by the method according to this invention is as follows.

First the rotor blades are manufactured as illustrated in FIGS. 1 through 6, for example. These rotor blades have a blade pan and a blade footing adjacent to the blade pan, whereby the blade footing is designed with a V-shaped cross section in at least some portions. Then the rotor blades thus manufactured are positioned on the rotor and/or rotor mount with the acutely tapering end 14 of the particular area 13 having a V-shaped cross section, whereby the acutely tapering end 14 stands upright on the lateral surface of the rotor mount. The rotor blades positioned on the rotor mount are then connected to at least one capacitor. Then, for capacitor discharge stud welding, the capacitor or each capacitor is discharged, thereby causing a current to flow through the particular area 13 of the blade footing 12 designed with a V-shaped cross section thereby causing the material of the rotor mount and the blade footing 12 to be heated to the welding temperature in the area 13 to form a weld joint due to the heat generated in the current flow. At the same time the required pressure force is applied to the rotor blades 10, so that the rotor blades 10 are compressed at least in the area 13.

FIG. 7 shows a detail of a rotor 21, such as that obtained following welding of a rotor blade 10 to a rotor mount and/or a ring-shaped or disk-shaped hub 22. As FIG. 7 indicates, the area 13 which has a V-shaped cross section is completely converted into a joining zone and/or a weld 23 in capacitor discharge stud welding.

After the rotor blades have been joined to the rotor mount and/or the hub by capacitor discharge stud welding, there is a final machining in the transitional area between the rotor blades and the hub. In this final machining, thickened spots and/or protruding material and/or welding notches are machined off until the final contour of the desired gas turbine rotor having integral blading is obtained. FIG. 7 shows a contour 24 with a dotted line such as that obtained in the area of the rotor blades 10 after the final processing. This final processing may be accomplished, for example, by adaptive milling or by electrochemical machining. In adaptive milling, the profile of the gas turbine rotor manufactured with the help of capacitor discharge stud welding is measured and a control program for milling is generated by a comparison of this measured value with a target profile. The term electrochemical machining is understood to refer to machining methods in which the principle of removal of material is based on an anodic dissolution of material during electrolysis. Those skilled in the art in the field in question here will be familiar with the details of the methods of final machining of the gas turbine rotor.

As FIG. 7 shows, in joining the rotor blades 10 to the hub 22, welding defects in the form of edge notches may develop. These edge notches 25 are removed with the help of adaptive milling or electrochemical machining in the final machining operation so that a high-precision defect-free gas turbine rotor having integral blading is obtained.

In this connection, it should be pointed out that when a rotor blade such as that depicted in FIG. 6 is used in joining by means of the capacitor discharge stud welding process, the depth of the grooves 19 and 20 should be selected to be smaller than the expected lateral extent of the edged notches 25.

The welding energy supplied by the capacitor discharge may optionally be increased by using addition energy sources. Thus in addition to the capacitor discharge, inductive heating of the welding zone may also be performed.

With the help of capacitor discharge stud welding, gas turbine rotors made of both nickel-based alloys and titanium-based alloys can be produced. When using titanium-based alloys, the welding area must be shielded from ambient air. In this case, capacitor discharge stud welding is performed under a protective gas atmosphere in a protective gas bell designed accordingly.

In capacitor discharge stud welding in contrast with linear friction welding, no bumps on the rotor mount, i.e., on the hub, are necessary. The rotor blades can be positioned directly on the lateral surface of the hub with the acutely tapering end 14 of the area 13. The method for manufacturing the gas turbine rotors by means of capacitor discharge stud welding is inexpensive and sturdy. There are only a few adjustable parameters such as capacitor discharge energy, introduction of pressure force, angle a of the V-shaped area of the blade footing and the type and manner of contacting of the capacitor or each capacitor to be discharged with the respective rotor blades.

The contacting for the required current flow is accomplished on the blade end in combination with the required pressure force in the area of the blade footing of the rotor blade and at the hub end in an area of the rotor mount which must still be reworked mechanically in the manufacture of the final contour of the integrally bladed gas turbine rotor.

Another advantage is that rotor blades approaching the final contour can be used in capacitor discharge stud welding. The required final processing may thus be minimized. The positional accuracy of the rotor blades on the hub and/or the rotor mount is very high because in contrast with linear friction welding, there is no relative movement between the rotor blades and the hub.

The invention claimed is:

1. A method for manufacturing gas turbine rotors having integral blading, wherein a plurality of rotor blades comprised of a blade pan and a footing of the blade connected thereto are mounted on a rotor mount, by capacitor discharge welding, wherein the footing of the blade includes a V-shaped cross section serving to provide contact between the rotor mount and the footing in the capacitor discharge welding and wherein the blade footing includes a non-V-shaped portion disposed between the V-shaped cross section and a groove defined by the rotor blade that extends along a length of the rotor blade, wherein a tool is engaged in the groove and a pressure force is applied to the rotor blade by the tool, and wherein thickened areas and/or protruding material and/or welding notches are machined off to a final contour of the gas turbine rotors having integral blading.

2. The method according to claim 1, wherein the rotor blades are mounted on the rotor mount by capacitor discharge stud welding.

3. The method according to claim 1, wherein an acutely tapered end of an area having the V-shaped cross section contacts the rotor mount, wherein the area has a cross section which becomes wider from the acutely tapered end to the blade pan.

4. The method according to claim 1, wherein the thickened areas and/or protruding material and/or welding notches are machined off by milling or by electrochemical machining.

5. A gas turbine rotor, comprising:
 a rotor blade having a blade pan and a blade footing, wherein the blade footing includes a V-shaped portion; and
 a rotor mount defining a recess therein;
 wherein the V-shaped portion of the blade footing is disposed within the recess of the rotor mount;
 and wherein the blade footing includes a non-V-shaped portion disposed between the V-shaped portion and a groove defined by the rotor blade that extends along a length of the rotor blade.

6. The gas turbine rotor according to claim 5, wherein the V-shaped portion is joined to the rotor mount by a capacitor discharge weld.

7. A method for joining a rotor blade to a rotor mount of a gas turbine rotor, comprising the steps of:
 disposing a V-shaped portion of a blade footing of the rotor blade in a recess defined by the rotor mount; and
 welding the V-shaped portion to the rotor mount by capacitor discharge welding;
 wherein the blade footing includes a non-V-shaped portion disposed between the V-shaped portion and a groove defined by the rotor blade that extends along a length of the rotor blade and further comprising the steps of engaging a tool in the groove and applying a pressure force to the rotor blade by the tool.

* * * * *